United States Patent
Noro

(10) Patent No.: US 7,209,374 B2
(45) Date of Patent: Apr. 24, 2007

(54) CAPACITOR-INPUT POSITIVE AND NEGATIVE POWER SUPPLY CIRCUIT

(75) Inventor: Masao Noro, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 170 days.

(21) Appl. No.: 10/746,738

(22) Filed: Dec. 24, 2003

(65) Prior Publication Data

US 2004/0145930 A1    Jul. 29, 2004

(30) Foreign Application Priority Data

Dec. 27, 2002    (JP)    ............................ 2002-380947

(51) Int. Cl.
*H02M 7/12*    (2006.01)
(52) U.S. Cl. ........................................ 363/89; 363/126
(58) Field of Classification Search .................. 363/15, 363/16, 84, 89, 125, 126, 127
See application file for complete search history.

(56) References Cited

U.S. PATENT DOCUMENTS

| | | | | |
|---|---|---|---|---|
| 4,519,024 A | * | 5/1985 | Federico et al. ............ | 363/127 |
| 4,819,145 A | * | 4/1989 | Maeba ......................... | 363/63 |
| 5,038,266 A | * | 8/1991 | Callen et al. ................. | 363/89 |
| 5,351,179 A | * | 9/1994 | Tsai et al. .................... | 363/53 |
| 5,687,071 A | * | 11/1997 | Debruyne et al. .......... | 363/127 |
| 5,991,167 A | * | 11/1999 | Van Lerberghe ............. | 363/16 |
| 6,064,580 A | * | 5/2000 | Watanabe et al. ............. | 363/17 |
| 6,128,206 A | * | 10/2000 | Sun et al. .................... | 363/127 |
| 6,169,681 B1 | | 1/2001 | Kemp .......................... | 363/98 |
| 6,239,994 B1 | * | 5/2001 | Abdoulin ..................... | 363/89 |
| 6,288,919 B1 | * | 9/2001 | Jain ............................. | 363/89 |
| 6,426,884 B1 | * | 7/2002 | Sun .............................. | 363/17 |
| 6,477,063 B2 | * | 11/2002 | Ishii et al. ............... | 363/21.04 |
| 6,671,193 B1 | * | 12/2003 | Pelkonen ..................... | 363/53 |
| 6,912,143 B2 | * | 6/2005 | Gan et al. .................... | 363/89 |
| 2002/0118551 A1 | * | 8/2002 | Ishii et al. ................... | 363/16 |

FOREIGN PATENT DOCUMENTS

| | | |
|---|---|---|
| JP | 5922790 | 7/1984 |
| JP | 02261053 A | 10/1990 |
| JP | H07-115774 | 5/1995 |
| JP | 09098570 A | 4/1997 |
| JP | 2002-84753 | 3/2002 |

OTHER PUBLICATIONS

Hideki Oie, Official Action, Japanese Patent Office (Japan), (Jan. 13, 2006).
State Intellectual Property Office of People's Republic of China, "First Office Action," (Jul. 7, 2006).

* cited by examiner

*Primary Examiner*—Jeffrey Sterrett
(74) *Attorney, Agent, or Firm*—Pillsbury Winthrop Shaw Pittman LLP

(57) ABSTRACT

There is provided a power supply circuit having a simple configuration which is capable of eliminating an adverse effect due to pumping operation. The capacitor-input positive and negative power supply circuit is comprised of diodes, switching circuits connected in parallel with the diodes, and control circuits that control the switching circuits such that the switching circuits conduct during a time period over which the diodes conduct.

7 Claims, 8 Drawing Sheets

CAPACITOR-INPUT POSITIVE AND NEGATIVE POWER SUPPLY CIRCUIT

BACKGROUND OF THE INVENTION

1. Field of the Invention

The present invention relates to a power supply circuit, and more particularly to a power supply circuit that drives an inductance load.

2. Description of the Related Art

FIG. 6 is a circuit diagram showing an example of the circuit configuration of a conventional power supply circuit and a digital amplifier connected thereto.

In FIG. 6, reference numeral 51 designates a transformer, reference numerals 52 and 53 designate rectifier devices (diodes), and reference numerals 54 and 55 designate smoothing capacitors. These component parts form a capacitor-input positive and negative power supply circuit. The transformer 51 has a winding of which one end is connected to the anode of the diode 52 and the other end is connected to the cathode of the diode 53. The cathode of the diode 52 is connected to one end of the smoothing capacitor 54 and a positive voltage (+V) input terminal of the digital amplifier. The other end of the smoothing capacitor 54 is connected to a ground terminal G of the digital amplifier, a center tap of the winding of the transformer 51, and one end of the smoothing capacitor 55. The anode of the diode 53 is connected to the other end of the smoothing capacitor 55 and a negative voltage (−V) input terminal of the digital amplifier.

In the digital amplifier, symbols SW1 and SW2 designate switching transistors, such as MOSFET's, driven by an output from a PWM (Pulse Width Modulation) circuit, not shown. Symbols D1 and D2 designate diodes (flywheel diodes) connected in parallel with the switching transistors SW1 and SW2, respectively. Symbols LF, CF, and RL designates an inductor (coil), a capacitor, and a load (speaker), respectively. The positive voltage (+V) input terminal of the digital amplifier is connected to the cathode of the diode D1 and one end of the switching transistor SW1, while the negative voltage (−V) input terminal of the same is connected to the anode of the diode D2 and one end of the switching transistor SW2. The anode of the diode D1, the cathode of the diode D2, and the respective other ends of the switching transistors SW1 and SW2 are connected to one end of the inductor LF, and the other end of the inductor LF is grounded via the capacitor CF and connected to one end of the load RL. The other end of the load RL is grounded as well as connected to the ground terminal of the digital amplifier.

In the circuit configured as above, signals formed by PWM of an input signal drive the switching transistors SW1 and SW2 complementarily to drive the load RL (speaker), via a low-pass filter formed by the inductor LF and the capacitor CF. More specifically, when the switching transistor SW1 conducts (and the switching transistor SW2 does not conduct), an electric current (I+) flows from the positive power supply, as shown in FIG. 6, and then when the switching transistor SW2 conducts (and the switching transistor SW1 does not conduct), an electric current (I−) flows to the negative power supply, as shown in FIG. 6, whereby the load RL is driven. This kind of digital amplifier is known as a very highly efficient amplifier.

However, when the inductance load is driven by the positive and negative power supply circuit as described above, there is a problem of pumping operation. Hereafter, the pumping operation will be explained with reference to FIG. 7.

FIG. 7 is a timing chart showing waveforms of voltages and electric currents detected at relevant elements when a positive DC voltage VRL is supplied to the load RL.

As shown in (a) of FIG. 7, when the positive DC voltage VRL is applied to the load, a time period T1 over which the switching transistor SW1 conducts is set to be longer than a time period T2 over which the switching transistor SW2 conducts. During the time period T1 from a time point t1 to a time point t2, over which the switching transistor SW1 conducts, an electric current I1 flows from the positive power supply through a path comprised of the switching transistor SW1, the inductor LF, the load RL, and the ground ((c) of FIG. 7). Then, at the time point t2, the switching transistor SW1 is brought out of conduction and the switching transistor SW2 is brought into conduction. Even at this time, due to the inductance which has the property of maintaining the flow of the electric current, the flow of electric current is continued by an electric current I2, as illustrated in FIG. 6, which flows through a path comprised of the diode D2, the inductor LF, the load RL, and the capacitor 55 ((d) of FIG. 7). The clock of PWM has such a high frequency that before an electric current I− starts to flow to the negative power supply through the switching transistor SW2, a time point t3 is reached at which the switching transistor SW1 is brought into conduction, and the switching transistor SW2 is brought out of conduction, whereby the electric current I1 flows again. Thus, a load current IL flows through the load RL as shown in (b) of FIG. 7.

The direction in which the electric current I2 flows during the time period T2 over which the switching transistor SW2 is in conduction is opposite to the direction in which the electric current I− flows through the switching transistor SW2 during conduction thereof, so that the capacitor 55 is charged. For this reason, a voltage V2 charged in the capacitor 55 becomes higher than a voltage V1 across the capacitor 54 of the positive power supply side (V2>V1).

When a negative DC voltage is applied to the load, the power supply circuit and the digital amplifier operate in the opposite manner to that described above, and therefore the voltage V1 charged in the capacitor 54 of the positive power supply side becomes higher than the voltage V2 across the capacitor 55 of the negative power supply side (V1>V2).

As described above, the pumping operation causes imbalance in voltage between the positive power supply and the negative power supply, which results in degradation of operating efficiency. Further, since the capacitor 54 or 55 is charged with a very large amount of electric charge, it is necessary to use a capacitor with high breakdown voltage for prevention of breakage thereof.

When a bridge circuit formed of four switching elements is used to drive the load RL, the pumping operation does not occur. In this case, however, an increased number of switching transistors capable of driving a low impedance load are needed, which brings about the problem of increased cost.

A technique for preventing imbalance in voltage between the positive power supply and the negative power supply caused by the pumping operation of the positive and negative power supply circuit has already been proposed (see U.S. Pat. No. 6,169,681B1). However, the proposed technique is related to a choke-input power supply circuit, but not to the capacitor-input power supply circuit as shown in FIG. 6. Further, the circuit configuration for implementing the technique is very complicated.

SUMMARY OF THE INVENTION

It is an object of the present invention to provide a power supply circuit which is capable of eliminating an adverse effect of pumping operation, using a simple means.

To attain the above described object, the present invention provides a capacitor-input positive and negative power supply circuit comprising at least two rectifier devices, at least two switching circuits connected in parallel with respective ones of the rectifier devices, and a control device that controls the switching circuits such that the switching circuits conduct during a time period over which the rectifier devices conduct.

According to this power supply circuit, it is possible to prevent a smoothing capacitor from being charged by pumping operation when the capacitor-input positive and negative power supply circuit drives an inductance load, whereby breakage of the capacitor can be prevented. This makes it possible to eliminate the need to use a capacitor having a high breakdown voltage, thereby enabling cost saving and reducing the size of the power supply circuit.

Preferably, the rectifier devices comprise four rectifier devices forming a bridge rectifier circuit, and the switching circuits are connected in parallel with at least two of the four rectifier devices.

Preferably, the power supply circuit is a switching regulator having a primary side and a secondary side, the switching circuits being connected to the secondary side of the switching regulator, and the control device controls the switching circuits such that the switching circuits conduct in a same timing as a drive signal for driving the primary side of the switching regulator.

Preferably, the power supply circuit comprises a detector circuit that detects a time period over which a sinusoidal wave inputted to the rectifier devices exceeds a predetermined level, and the control device controls the switching circuits such that the switching circuits conduct during the time period detected by the detector circuit.

The above and other objects, features, and advantages of the present invention will become more apparent from the following detailed description taken in conjunction with the accompanying drawings.

DETAILED DESCRIPTION OF THE PREFERRED EMBODIMENTS

Figure 1A:
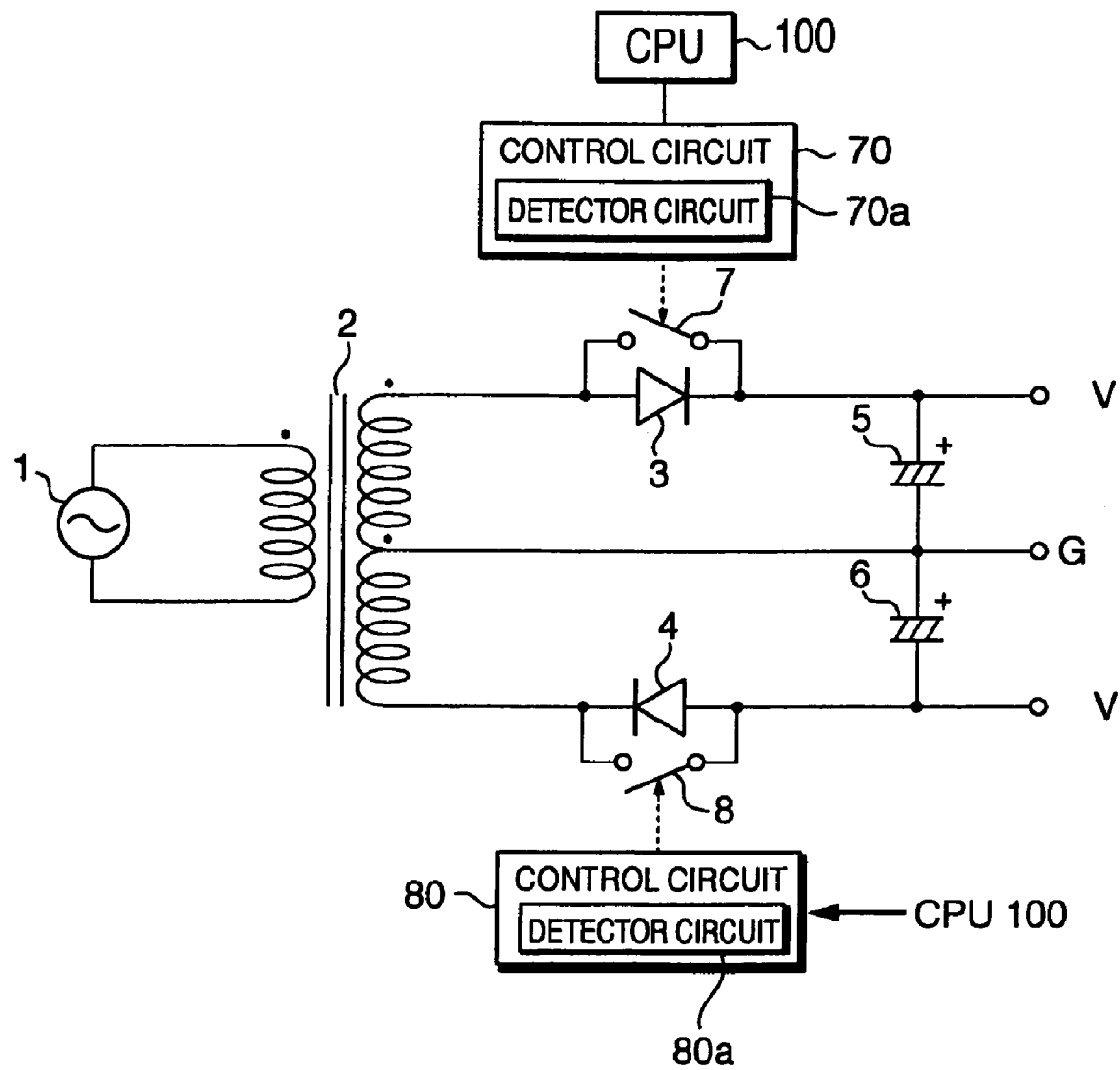
FIG. 1A is a circuit diagram showing the circuit configuration of a power supply circuit according to a first embodiment of the present invention.

The present invention will now be described in detail below with reference to the accompanying drawings showing preferred embodiments thereof. In the drawings, elements and parts which are identical throughout the views are designated by identical reference numerals, and duplicate description thereof is omitted.

A first embodiment of the present invention will be described with reference to FIGS. 1A, 1B and 2.

FIG. 1A is a circuit diagram showing the circuit configuration of a power supply circuit according to the first embodiment.

In FIG. 1A, reference numeral 1 designates an AC power supply, reference numeral 2 designates a transformer having a secondary winding with a center tap, and reference numerals 3 and 4 designate rectifier devices (diodes). Further, reference numeral 5 designates a capacitor connected between the diode 3 and the center tap, and reference numeral 6 designates a capacitor connected between the center tap and the diode 4.

These component parts 1 to 6 form a capacitor-input positive and negative power supply circuit. In the present embodiment, as shown in FIG. 1A, a switching circuit 7 (hereinafter referred to as "the switching element 7") is connected in parallel with the diode 3, and a switching circuit 8 (hereinafter referred to as "the switching element 8") is connected in parallel with the diode 4. Each of the switching circuits 7 and 8 can be implemented e.g. by a switching element, such as a switching transistor. Further, there are provided a control circuit 70 that turns on and off the switching element 7 and a control circuit 80 that turns on and off the switching element 8. The control circuits 70 and 80 are each implemented e.g. by an IC circuit, and are controlled by a CPU 100 in accordance with a control program stored in a ROM, not shown. The IC circuits 70 and 80 each further include a detector circuit 70a, 80a that detects a time period over which a sinusoidal wave inputted to the diode 3, 4 exceeds a predetermined level.

The control circuits 70 and 80 are controlled by the CPU 100 in accordance with the control program so as to cause the switching element 7, 8 to conduct during a time period over which the diodes 3 and 4 conduct simultaneously. The time period over which the switching elements 7 and 8 are brought into conduction may be part or all of the time period over which the diodes 3 and 4 conduct simultaneously.

Figure 1B:
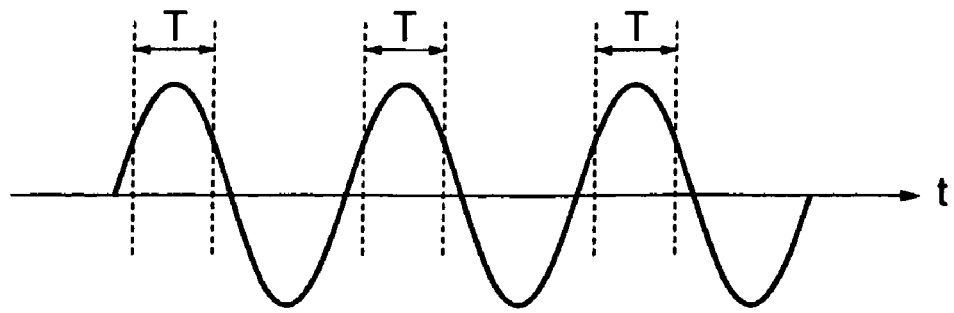
FIG. 1B is a waveform diagram useful in explaining a time period T over which control circuits 70 and 80 cause conduction of switching elements 7 and 8.

FIG. 1B is a waveform diagram showing an example of the time period T over which the switching elements 7 and 8 are brought into conduction by the control circuits 70 and 80. In the present embodiment, the detector circuits 70a and 80a detect the time period T over which the sinusoidal wave inputted to the diodes 3 and 4 exceeds the predetermined level, and in response to this, the CPU's 72 and 82 brings the switching elements 7 and 8 into conduction.

Figure 6:
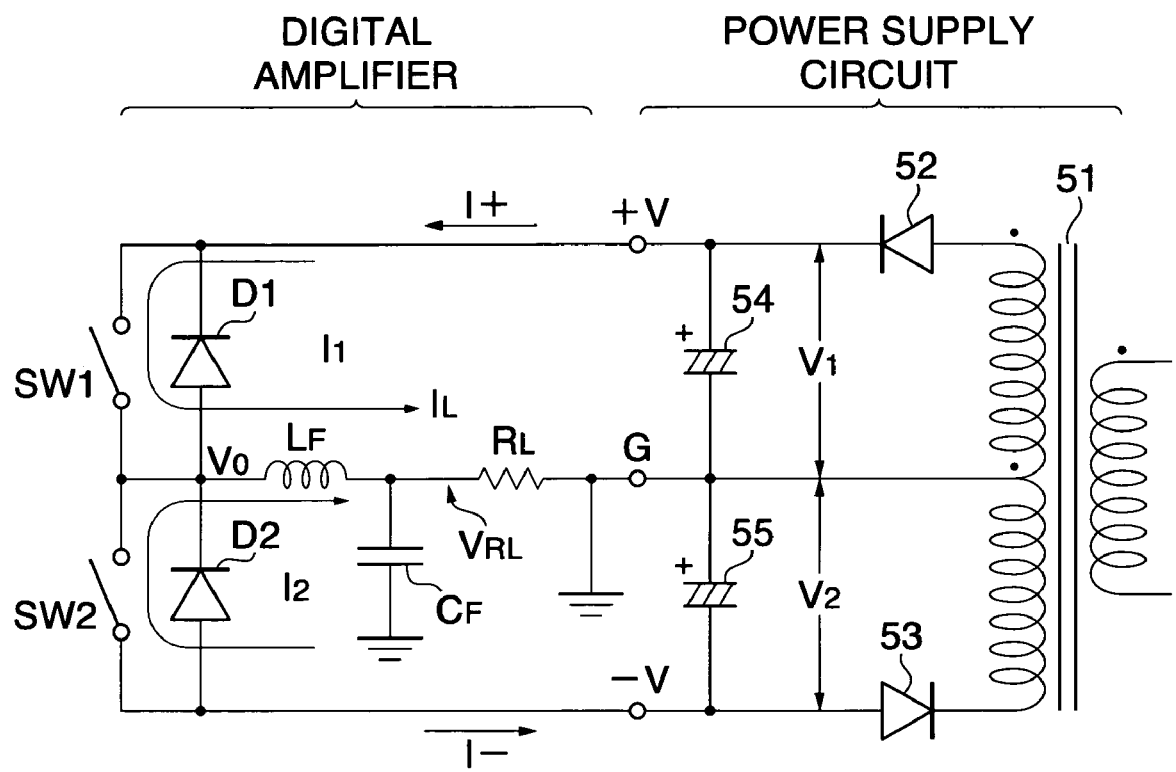
FIG. 6 is a circuit diagram showing an example of the circuit configuration of a conventional power supply circuit and a digital amplifier connected thereto.

The operation of the power supply circuit shown in FIG. 1A will be described with reference to FIG. 2. FIG. 2 is a circuit diagram showing the circuit configuration of the power supply circuit shown in FIG. 1 and a digital amplifier connected thereto. In FIG. 2, component parts and elements corresponding to ones appearing in FIGS. 6 and 1A are designated by identical reference numerals, and description thereof is omitted.

Assuming that in the secondary winding of the transformer 2, the number of turns n1' of a positive-side winding n1 thereof is equal to the number of turns n2' of a negative-side winding n2 thereof (n1'=n2') and the coupling between the two windings n1 and n2 is dense, a voltage Vn1 across the winding n1 and a voltage Vn2 across the winding n2 are constantly equal to each other (Vn1=Vn2).

Figure 7:
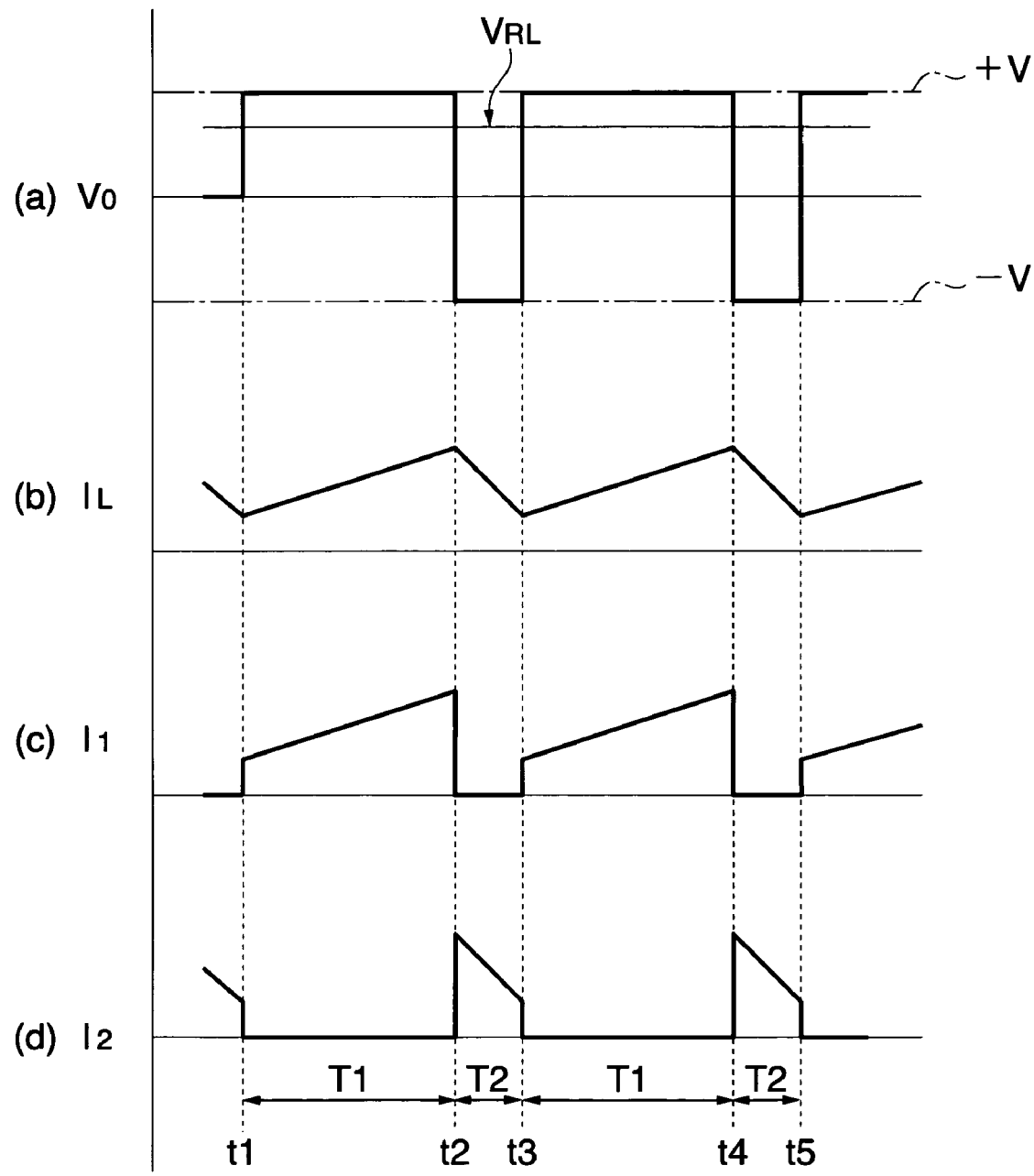
FIG. 7 is a timing chart showing waveforms of voltages and electric currents detected at relevant elements of the conventional power supply circuit and the digital amplifier shown in FIG. 6 when a positive DC voltage VRL is supplied to a load resistance RL.

Accordingly, as is the case with the prior art described before with reference to FIGS. 6 and 7, when a positive DC voltage is applied to the load, a voltage V2 across the negative-side capacitor 6 is higher than a voltage V1 across the positive-side capacitor 5 (V2>V1). To overcome this, the switching element 7 and the switching element 8 are simultaneously brought into conduction during a time period over which the diodes 3 and 4 conduct simultaneously, to cause electric currents I2 and I1 flow, as illustrated in FIG. 2, whereby the voltages V1 and V2 are made equal to each other. More specifically, the current I2 flows from the capacitor 6 having the higher voltage thereacross, to the switching element 8, via the center tap and the winding n2, so that the electric current I1 flows from the winding n1 to the capacitor 5 via the switching element 7. Thus, the transformer 2 functions such that the winding n2 acts as a primary winding and the winding n1 as a secondary winding. As a result, electric power obtained by the voltage V2 can be transferred to the voltage V1 side to thereby make the absolute value of the voltage of the positive power supply equal to that of the voltage of the negative power supply.

Figure 2:
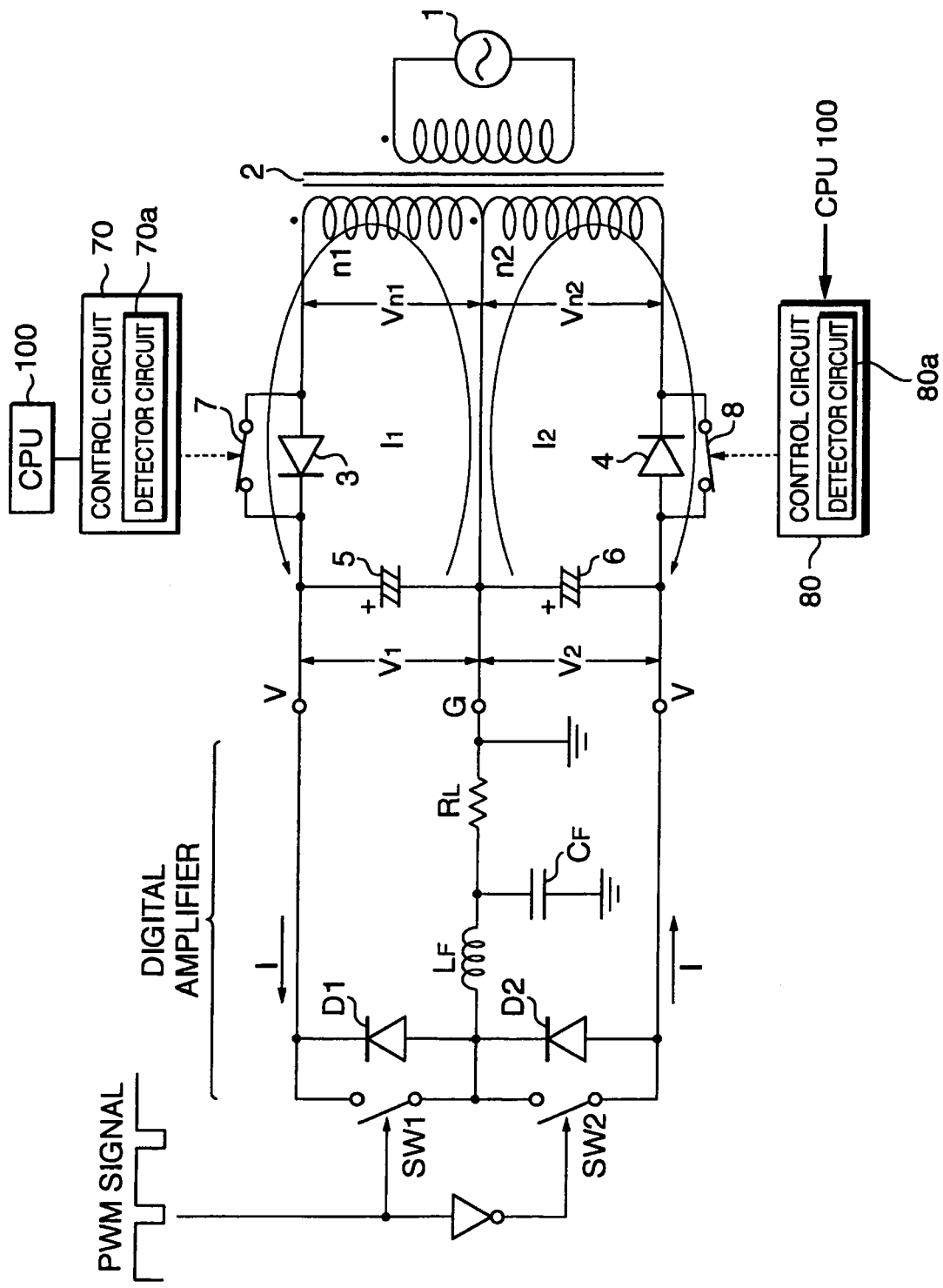
FIG. 2 is a circuit diagram showing the circuit configuration of the power supply circuit shown in FIG. 1A and a digital amplifier connected thereto.

Similarly, when a negative DC voltage is applied to the load, and the voltage V1 across the positive-side capacitor 5 is higher than that V2 across the negative-side capacitor 6 (V1>V2), the switching element 7 and the switching element 8 are simultaneously brought into conduction during the time period over which the diodes 3 and 4 conduct simultaneously, to cause the electric currents I1 and I2 to flow in respective opposite directions to the directions illustrated in FIG. 2, whereby electric power obtained by the voltage V1 can be transferred to the voltage V2 side.

As described above, according to the present embodiment, since electric charge stored in the capacitor 5 or 6 due to the pumping operation can be released, it is possible to prevent breakage of the capacitors and eliminate the need to use a capacitor with high breakdown voltage. Further, it is possible to prevent degradation of operating efficiency.

Next, a description will be given of a second embodiment of the present invention with reference to FIGS. 3A to 5.

Figure 3A:
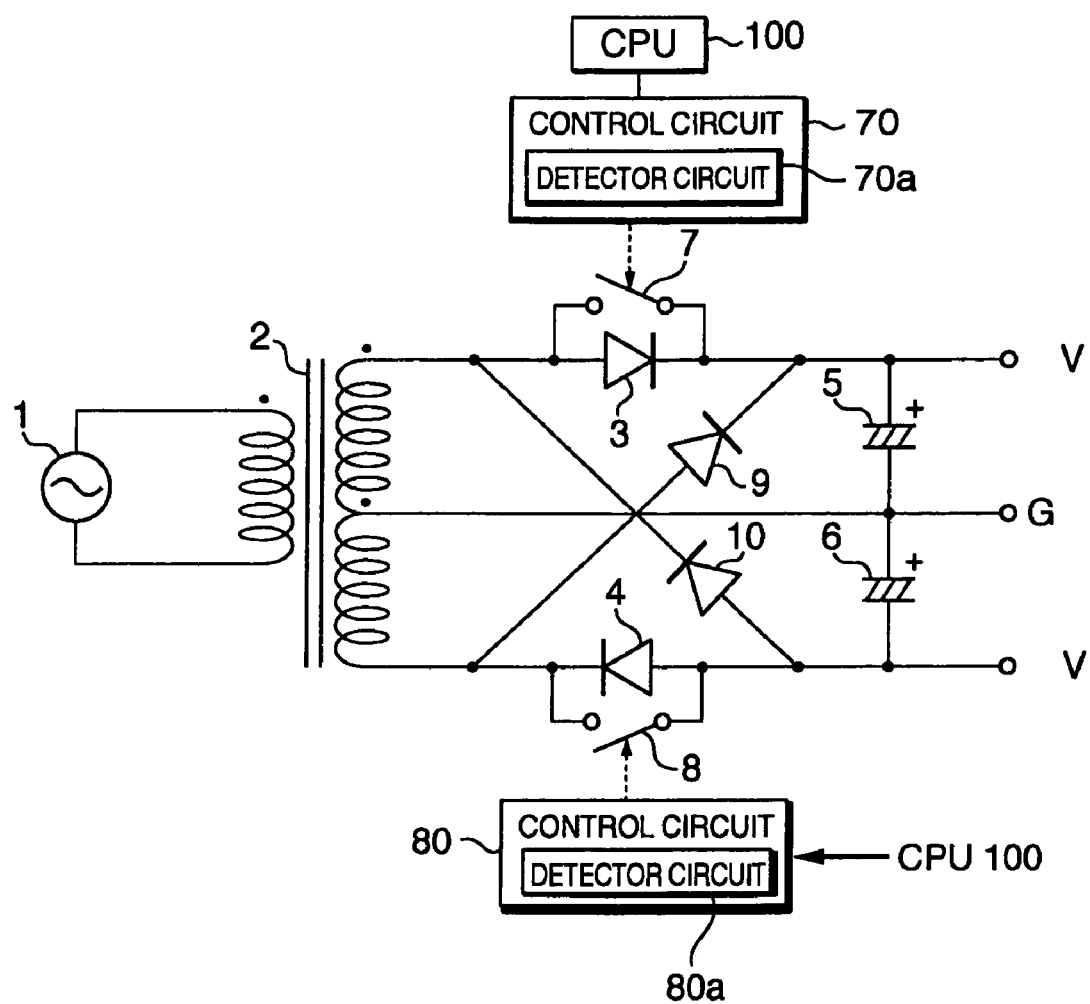
FIG. 3A is a circuit diagram showing the circuit configuration of a positive and negative power supply circuit that performs full-wave rectification, as a power supply circuit according to a second embodiment of the present invention.

While the first embodiment is applied to the positive and negative power supply circuit that performs half-wave rectification, shown in FIG. 1A, the second embodiment is applied to a positive and negative power supply circuit that performs full-wave rectification, shown in FIG. 3A.

Figure 3B:
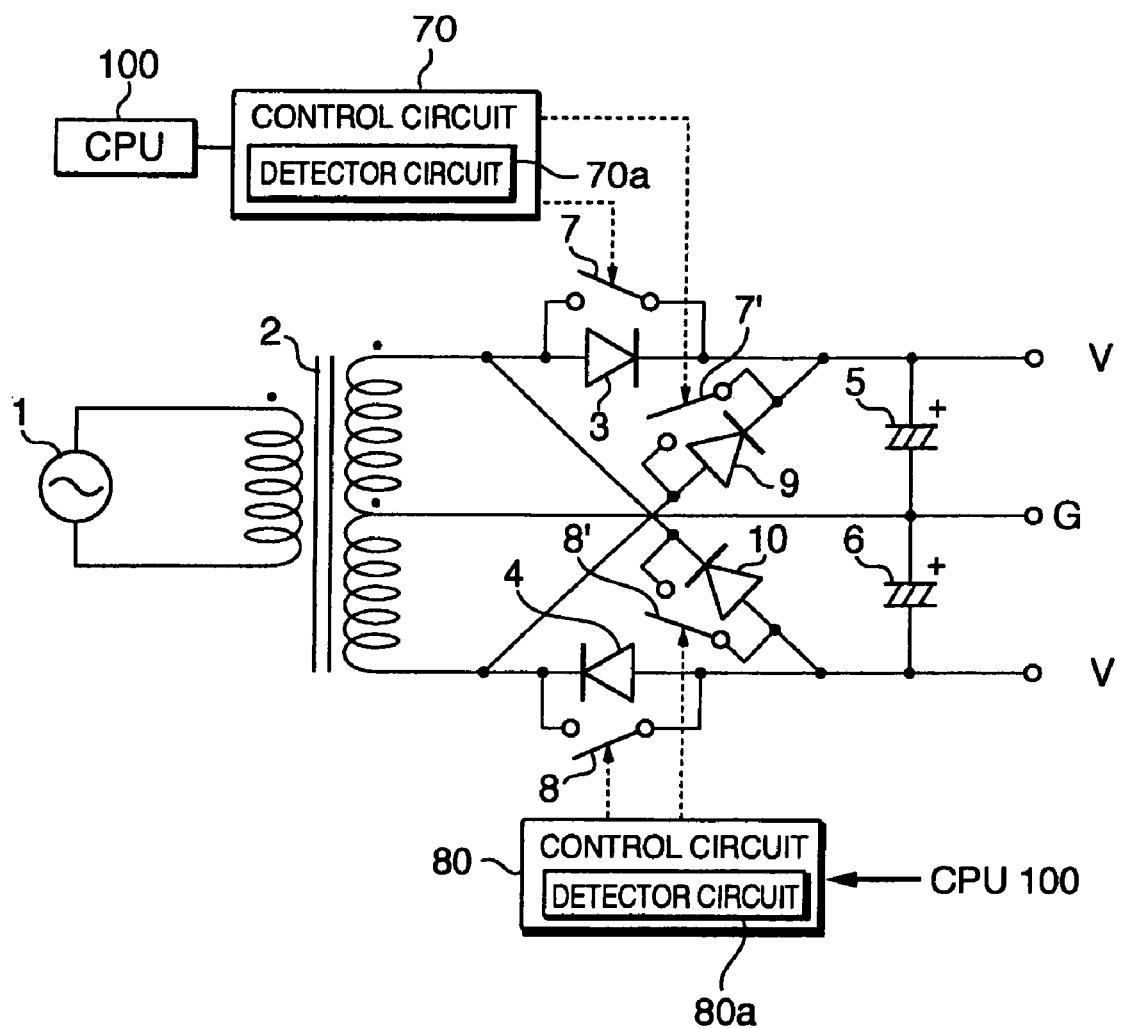
FIG. 3B is a circuit diagram showing the circuit configuration of a variation of the positive and negative power supply circuit shown in FIG. 3A.

The power supply circuit shown in FIG. 3A is distinguished from the power supply circuit shown in FIG. 1A only in that rectifier diodes 9 and 10 are additionally provided to form a bridge rectifier circuit together with the diodes 3 and 4. Out of the four diodes 3, 4, 9 and 10, only the switching element 7 and the switching element 8 are connected in parallel with the respective diodes 3 and 4, even when the power supply circuit employs the bridge rectifier circuit using the four diodes. Even with this connection, the same advantageous effects as described above can be obtained. The switching elements may be provided for the diodes 9 and 10, respectively, in place of the diodes 3 and 4. Alternatively, all the four diodes may be provided with respective switching elements connected in parallel therewith. FIG. 3B is a circuit diagram showing the circuit configuration of this variation of the positive and negative power supply circuit, in which there are additionally provided switching elements 7' and 8' connected in parallel with the diodes 9 and 10, respectively. The switching element 7' is controlled by the control circuit 70, while the switching element 8' is controlled by the control circuit 80.

The control of the switching elements may be carried out not by the control circuits 70, 80, but by other suitable means including switching transistors, as in the case of a switching regulator shown in FIG. 4, described in detail hereinafter. Further, the switching circuits 70, 80 may be implemented by a single circuit, and the output therefrom may be supplied to all the switching elements.

Figure 4:
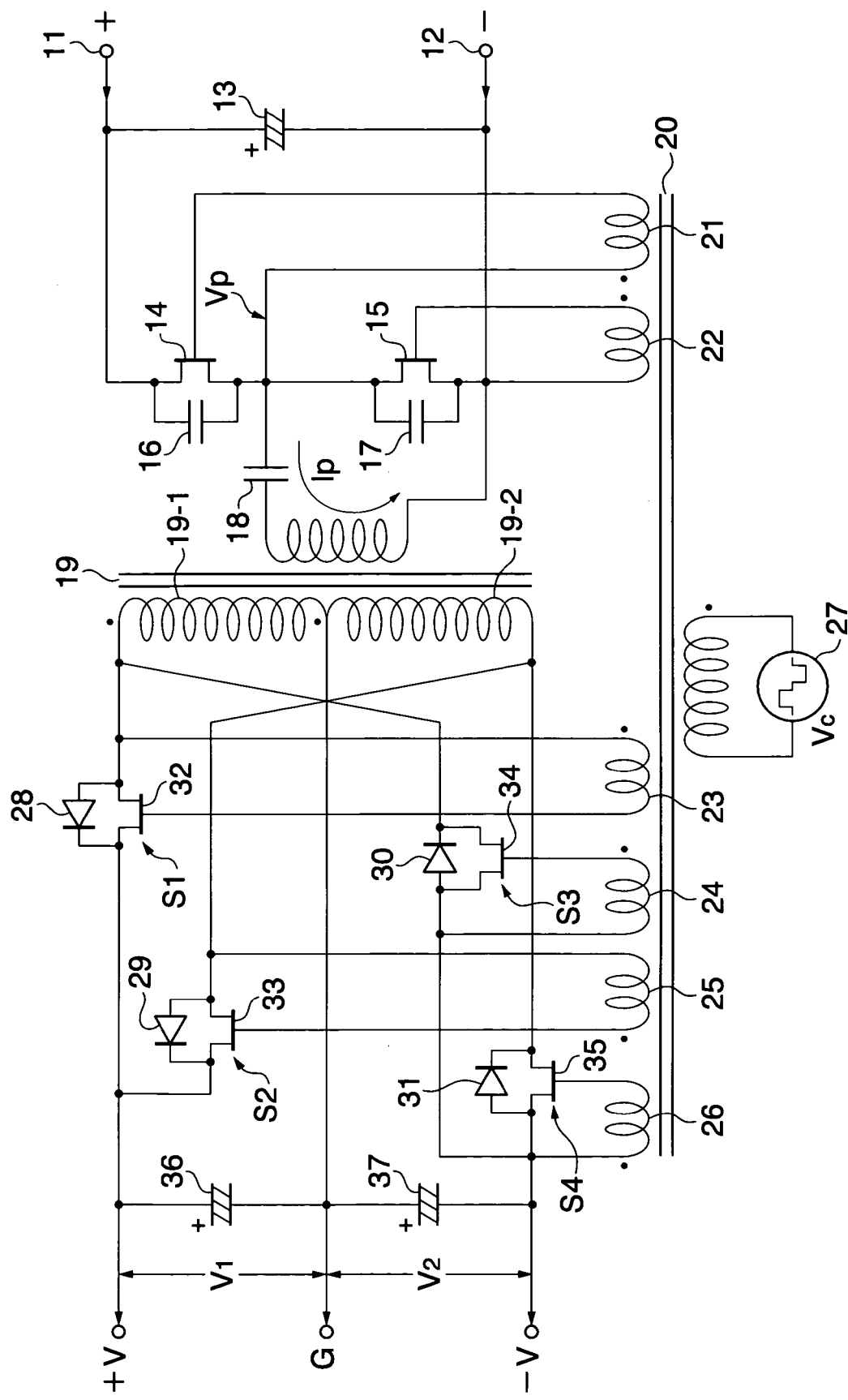
FIG. 4 is a circuit diagram showing the circuit configuration of a switching regulator to which is applied the positive and negative power supply circuit shown in FIG. 3B.
Figure 5:
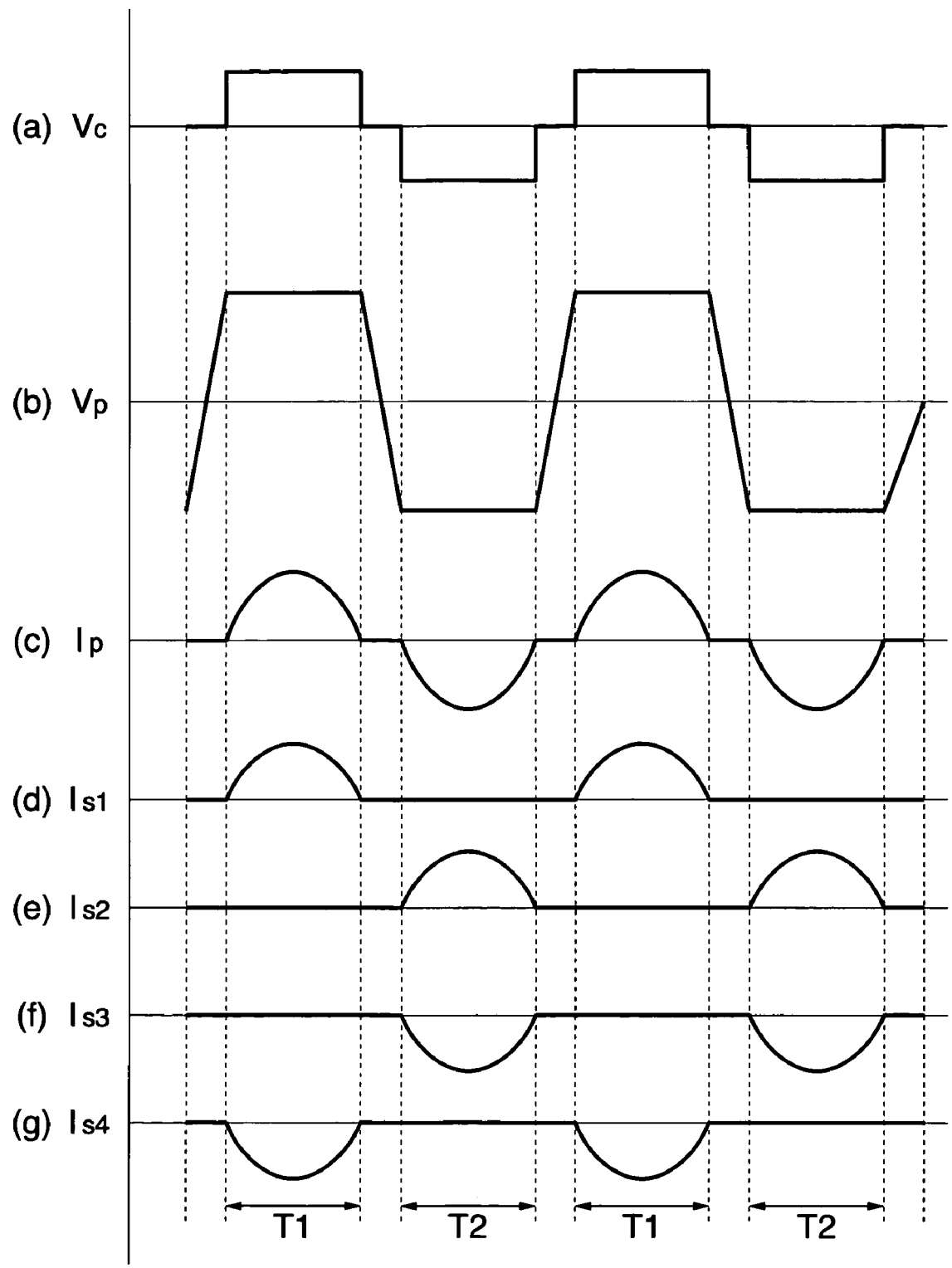
FIG. 5 is a timing chart showing waveforms of voltages and electric currents detected at relevant elements of the switching regulator shown in FIG. 4.

FIG. 4 is a circuit diagram showing the circuit configuration of a switching regulator to which the positive and negative power supply circuit shown in FIG. 3B is applied (using, however, the switching transistors and their associated secondary windings, in place of the control circuits 70, 80), and FIG. 5 is a timing chart showing waveforms of voltages and electric currents detected in component elements of the switching regulator in FIG. 4.

In FIG. 4, reference numerals 11 and 12 designate DC power supply input terminals. Reference numerals 13, and 16 to 18 designate capacitors, and reference numerals 14 and 15 switching transistors. Reference numeral 19 designates an output transformer, and reference numerals 19-1 and 19-2 designate secondary windings of the output transformer 19. Reference numeral 20 designates a drive transformer, reference numerals 21 to 26 secondary windings of the drive transformer 20, and reference numeral 27 a drive signal generator. Reference numerals 28 to 31 designate rectifier devices (diodes), and reference numerals 32 to 35 designate switching elements connected in parallel with the diodes 28 to 31. Reference numerals 36 and 37 designate smoothing capacitors.

In FIG. 4, the capacitor 13 is connected between the DC power supply input terminals 11 and 12, and the DC power supply input terminal 11 is connected to respective one ends of the capacitor 16 and the switching transistor 14 connected in parallel with the capacitor 16. The respective other ends of the capacitor 16 and the switching transistor 14 are connected to respective one ends of the capacitor 17, the capacitor 18, and the switching transistor 15 connected in parallel with the capacitor 17. Connected to the one ends of the capacitor 17, the capacitor 18, and the switching transistor 15 is one end of the secondary winding 21 of the drive transformer 20, and the other end of the secondary winding 21 is connected to a control signal input of the switching transistor 14. Connected to the respective other ends of the capacitor 17 and the switching transistor 15 are one end of the secondary windings 22 of the drive transformer 20, one end of a primary winding of the output transformer 19, and the DC power supply input terminal 12, and the other end of the secondary winding 22 of the drive transformer 20 is connected to a control signal input of the switching transistor 15. The other end of the primary winding of the output transformer 19 is connected to the other end of the capacitor 18.

Further, the secondary winding 19-1 of the output transformer 19 has one end thereof connected to the anode of the diode 28, one end of the switching element 32 connected in parallel with the diode 28, one end of the secondary winding 23 of the drive transformer 20, the cathode of the diode 30, and one end of the switching element 34 connected in parallel with the diode 30. The cathode of the diode 28 and the other end of the switching element 32 are connected to the anode plate of the smoothing capacitor 36, a positive voltage (+V) output terminal, the cathode of the diode 29, and one end of the switching element 33. The secondary winding 19-2 of the output transformer 19 has one end thereof connected to the anode of the diode 29, the other end of the switching element 33, one end of the secondary winding 25 of the drive transformer 20, the cathode of the diode 31, and one end of the switching element 35 connected in parallel with the diode 31. The anode of the diode 30 and the other end of the switching element 34 are connected to the cathode plate of the smoothing capacitor 37, a negative voltage (−V) output terminal, the anode of the diode 31, the other end of the switching element 35, and respective one ends of the secondary windings 24 and 26 of the drive transformer 20. The respective other ends of the secondary windings 23 to 26 of the drive transformer 20 are connected to respective control signal inputs of the switching elements 32, 34, 33, and 35. Connected to a ground terminal G are the cathode plate of the smoothing capacitor 36, the anode plate of the smoothing capacitor 37, and the center tap of the output transformer 19.

In the power supply circuit constructed as above, when a drive signal shown in (a) of FIG. 5 is supplied to the primary winding of the drive transformer 20, voltages generated across the secondary windings 21 and 22 cause the switching transistors 14 and 15 to be alternately brought into conduction, whereby the output transformer 19 is driven. Consequently, voltages are generated across the secondary windings 19-1 and 19-2 of the output transformer 19 with the center tap therebetween and are subjected to full-wave rectification by the diodes 28 to 31 forming a bridge rectifier circuit, whereby a positive power supply voltage +V is generated across the smoothing capacitor 36, and a negative power supply voltage −V is generated across the smoothing capacitor 37.

Outputs from the secondary windings 23 to 26 of the drive transformer 20 are supplied as control signals to the respective associated switching elements 32 to 35. The switching element 32(S1) connected in parallel with the diode 28 and the switching element 35(S4) connected in parallel with the diode 31 are brought into conduction in the same timing as the switching transistor 14, while the switching element 33(S2) connected in parallel with the diode 29 and the switching element 34(S3) connected in parallel with the diode 30 are brought into conduction in the same timing as the switching transistor 15.

Thus, electric currents flow to the respective switching elements as shown in (d) to (g) of FIG. 5, whereby imbalance in electric charge between the capacitors 37 and 36 caused by pumping can be eliminated. Examples of (d) to (g) in FIG. 5 show respective electric currents that flow when a voltage V2 across the capacitor 37 is higher than a voltage V1 across the capacitor 36 (V2>V1). More specifically, during each time period T1 in FIG. 5, an electric current Is4 flows from the capacitor 37 through the secondary winding 19-2 of the transformer 19 to the switching element 35, whereby an electric current Is1 flows from the secondary winding 19-1 of the transformer 19 through the switching element 32 to the capacitor 36. During each time period T2, an electric current Is3 flows from the capacitor 37 through the secondary winding 19-1 to the switching element 34, whereby an electric current Is2 flows from the secondary winding 19-2 through the switching element 33 to the capacitor 36. When V1>V2 holds, the power supply circuit also operates similarly.

As described above, when the switching elements 32 to 35 are brought into conduction, corresponding electric currents flow such that the voltage V1 becomes equal to the voltage V2, whereby imbalance in voltage between the positive power supply and the negative power supply is eliminated.

Although in the power supply circuit shown in FIG. 4, the switching elements 32 to 35 are connected in parallel with all the respective diodes 28 to 31, switching elements may be provided in the associated pair of diodes 28, 31 alone or the associated pair of diodes 29, 30 alone just as in the power supply circuit described with reference to FIG. 3A.

Although in the above described embodiments, each of the switching elements 7, 8, and 32 to 35 connected, respectively, in parallel with the diodes 3 and 4 (FIGS. 1 to 3B) and the diodes 28 to 31 (FIG. 4) is caused to conduct over a predetermined time period, irrespective of directions in which the electric currents (I1, I2, Is1 to Is4) flow, this is not limitative, but only switching elements may be selectively closed when the associated diodes connected in parallel therewith provide reverse bias. More specifically, by detecting the amount of electric charge stored in each of the capacitors 5 and 6 (FIGS. 1 to 3) or 36 and 37 (FIG. 4), or by determining a direction of flow of each of the electric currents I1 and I2 or Is1 to Is4 based on a PWM signal for driving the switching transistors SW1 and SW2, the drive signal may be supplied exclusively to one or ones (of the switching elements 7 and 8, or 32 to 35) having a parallel-connected diode which provides reverse bias with respect to the direction of current flow.

Further, although in the above described embodiments, a digital amplifier is driven as an example of the inductance load, this is not limitative, but the power supply circuit according to the present invention can be applied to any power supply that drives a load insofar as the power supply is of the capacitor-input type that drives an inductance load.

What is claimed is:

1. A capacitor-input positive and negative power supply circuit that drives an inductance load, for use in a digital amplifier, comprising:
    a transformer having secondary windings with a center tap;
    at least two rectifier devices that rectify voltages generated across said secondary windings with the center tap;
    positive and negative capacitors that receive outputs rectified by said at least two rectifier devices, respectively;
    at least two switching circuits connected in parallel with said at least two rectifier devices, respectively;
    a control device that controls said switching circuits such that said switching circuits conduct alternately during a time period over which said rectifier devices conduct, whereby imbalance in voltage between a voltage across said positive capacitor and a voltage across said negative capacitor is eliminated; and
    a detector circuit that detects a time period over which a sinusoidal wave inputted to said rectifier devices exceeds a predetermined level, and wherein said control device controls said switching circuits such that said switching circuits conduct during the time period detected by said detector circuit.

2. A capacitor-input positive and negative power supply circuit that drives an inductance load, for use in a digital amplifier, comprising:

a transformer having secondary windings with a center tap;
four rectifier devices, forming a bridge rectifier circuit, that rectifies voltages generated across said secondary windings with a center tap;
positive and negative capacitors that receive outputs rectified by said four rectifier devices, respectively;
at least two switching circuits connected in parallel with at least two of said four rectifier devices, respectively, wherein said at least two of said four rectifier devices are brought into conduction at the same time; and
a control device that controls said at least two switching circuits such that said at least two switching circuits conduct complementarily during the whole or part of a time period over which said rectifier devices conduct, whereby imbalance in voltage between a voltage across said positive capacitor and a voltage across said negative capacitor is eliminated.

3. A capacitor-input power supply circuit that drives an inductance load, for use in a digital amplifier, comprising:
a transformer having a primary side, a secondary side, and a center tap, said center tap defining an output ground and said secondary side including a first terminal and a second terminal;
a first diode, and a first switching circuit connected in parallel therewith, wherein one end of the first switching circuit is connected to the transformer's first terminal and to the anode of the first diode and a second end of the first switching circuit is connected to the cathode of the first diode;
a second diode, and a second switching circuit connected in parallel therewith, wherein one end of the second switching circuit is connected to the transformer's second terminal and to the cathode of the second diode and a second end of the second switching circuit is connected to the anode of the second diode, wherein said first and second diodes are brought into conduction at the same time;
a first capacitor connected at a first end to said output ground and, at a second end, to said second end of the first switching circuit and to a positive output terminal of the power supply circuit;
a second capacitor connected at a first end to said output ground and, at a second end, to said second end of the second switching circuit and to a negative output terminal of the power supply circuit; and
a control device that controls said first and second switching circuits such that the switching circuits conduct alternately during the whole or part of a time period over which said first and second diodes conduct, whereby imbalance in voltage between a voltage across said first capacitor and a voltage across said second capacitor is eliminated.

4. The capacitor-input power supply circuit of claim 3, further comprising a detector circuit that detects a time period over which a sinusoidal wave inputted to said diodes exceeds a predetermined level, said control device controlling the switching circuits such that the switching circuits conduct during the time period detected by the detector circuit.

5. The capacitor-input power supply circuit of claim 3, wherein said secondary side of the transformer does not include an inductor.

6. The capacitor-input power supply circuit of claim 3, further including third and fourth diodes to form a bridge rectifier circuit, wherein:
the cathode of the third diode is connected to the transformer's first terminal;
the anode of the third diode is connected between the second capacitor's second end and the second end of the second switching circuit;
the anode of the fourth diode is connected to the transformer's second terminal; and
the cathode of the fourth diode is connected between the first capacitor's second end and the second end of the first switching circuit.

7. The capacitor-input power supply circuit of claim 6, further including a third switching circuit connected in parallel with the third diode and a fourth switching circuit connected in parallel with the fourth diode.

* * * * *